(12) United States Patent
Fuke et al.

(10) Patent No.: US 11,662,881 B2
(45) Date of Patent: May 30, 2023

(54) INFORMATION PROCESSING DEVICE, INFORMATION PROCESSING METHOD, VEHICLE, TRANSMISSION METHOD, AND STORAGE MEDIUM

(71) Applicant: TOYOTA JIDOSHA KABUSHIKI KAISHA, Toyota (JP)

(72) Inventors: Jumpei Fuke, Toyota (JP); Kuniharu Tsuzuki, Handa (JP); Shimpei Asai, Okazaki (JP); Shota Honda, Miyoshi (JP); Nobuyoshi Nagai, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/892,221

(22) Filed: Aug. 22, 2022

(65) Prior Publication Data

US 2023/0098720 A1 Mar. 30, 2023

(30) Foreign Application Priority Data

Sep. 21, 2021 (JP) ............................. JP2021-153584

(51) Int. Cl.
*G06F 3/04817* (2022.01)
*B60R 25/24* (2013.01)
*G06F 3/0484* (2022.01)

(52) U.S. Cl.
CPC .......... *G06F 3/04817* (2013.01); *B60R 25/24* (2013.01); *G06F 3/0484* (2013.01)

(58) Field of Classification Search
CPC ..... G06F 3/04817; G06F 3/0484; B60R 25/24
See application file for complete search history.

(56) References Cited

U.S. PATENT DOCUMENTS

| | | | |
|---|---|---|---|
| 2017/0120867 A1* | 5/2017 | Beauvais | ................ B60R 25/24 |
| 2017/0232931 A1* | 8/2017 | Fernando | .............. B60R 25/241 701/2 |
| 2018/0194323 A1* | 7/2018 | Woodill, Jr. | ........ G07C 9/00309 |
| 2019/0121535 A1* | 4/2019 | Tamane | ............. G07C 9/00309 |
| 2019/0147679 A1* | 5/2019 | Suzuki | ............... G07C 9/00309 340/5.72 |
| 2019/0152436 A1* | 5/2019 | Uenoyama | ............ H04W 12/08 |
| 2021/0237684 A1 | 8/2021 | Sakurada et al. | |
| 2022/0089119 A1* | 3/2022 | DeLong | .................. B60R 25/06 |

FOREIGN PATENT DOCUMENTS

JP 2021-120530 A 8/2021

* cited by examiner

*Primary Examiner* — Mong-Shune Chung
(74) *Attorney, Agent, or Firm* — Oblon, McClelland, Maier & Neustadt, L.L.P.

(57) ABSTRACT

An information processing device that is used to control a vehicle, includes: a first acquisition unit that acquires information pertaining to a switch that has been operated on a smart key corresponding to the vehicle; and a display control unit that performs control to display an operation screen for controlling the vehicle based on the information pertaining to the switch that has been acquired by the first acquisition unit.

11 Claims, 9 Drawing Sheets

INFORMATION PROCESSING DEVICE, INFORMATION PROCESSING METHOD, VEHICLE, TRANSMISSION METHOD, AND STORAGE MEDIUM

CROSS-REFERENCE TO RELATED APPLICATION

This application is based on and claims priority under 35 USC 119 from Japanese Patent Application No. 2021-153584 filed on Sep. 21, 2021, the disclosure of which is incorporated by reference herein.

BACKGROUND

Technical Field

The present disclosure relates to an information processing device, an information processing method, an information processing program storage medium, a vehicle, a transmission method, and a non-transitory storage medium storing a transmission program.

Related Art

Japanese Patent Application Laid-open (JP-A) No. 2021-120530 discloses a digital key system that realizes controls of a vehicle, specifically locking and unlocking doors of the vehicle, by operations on an information processing device such as a smartphone that may serve as a digital key.

Usually, vehicle controls that may be realized by operating a smart key are not limited to locking and unlocking the doors of the vehicle and vary by vehicle in accordance with the equipment of the vehicle, which differs depending on the model, trim level, and options package of the vehicle. For this reason, it is desired to also configure a digital key to be able to display, like a smart key, an appropriate operation screen according to the vehicle controlled by the digital key.

SUMMARY

The present disclosure has been made in consideration of the above circumstances and provides an information processing device that may display an appropriate operation screen according to the corresponding vehicle, an information processing method, a storage medium in which an information processing program is stored, a vehicle, a transmission method, and a non-transitory storage medium in which a transmission program is stored.

A first aspect of the disclosure is an information processing device that is used to control a vehicle and that includes: a first acquisition unit that acquires information pertaining to a switch that has been operated on a smart key corresponding to the vehicle; and a display control unit that performs control to display an operation screen for controlling the vehicle based on the information pertaining to the switch that has been acquired by the first acquisition unit.

In the first aspect, since the information processing device displays the operation screen for controlling the vehicle based on the information pertaining to the switch that has been operated on the smart key corresponding to the vehicle, the information processing device may display an appropriate operation screen according to the corresponding vehicle.

A second aspect is the first aspect, wherein the first acquisition unit acquires the information pertaining to the switch by receiving the information from the vehicle.

According to the second aspect, even if the information processing device was not operating when the switch was operated on the smart key, the first acquisition unit may acquire the information pertaining to the switch from the vehicle.

A third aspect is the first aspect, wherein the first acquisition unit acquires the information pertaining to the switch by intercepting communication from the smart key to the vehicle which accompanies the switch being operated on the smart key.

According to the third aspect, the information pertaining to the switch may be acquired without altering the configuration of the vehicle.

A fourth aspect is any of the first aspect to the third aspect, wherein in a case in which the switch has not been operated on the smart key, the display control unit performs control to display, as the operation screen, an operation screen including a first icon for locking doors of the vehicle and a second icon for unlocking the doors of the vehicle.

According to the fourth aspect, even at the stage where the switch has not been operated on the smart key, it becomes possible to perform minimum controls common to the vehicle, namely, locking and unlocking the doors of the vehicle.

A fifth aspect is any of the first aspect to the fourth aspect, further including a first storage unit that stores use permission information that defines one or more controls of the vehicle that are permitted for the information processing device is permitted, wherein the display control unit performs control to display an operation screen including icons corresponding to the controls of the vehicle that is permitted by the use permission information among controls of the vehicle corresponding to switches whose information has been acquired by the first acquisition unit.

According to the fifth aspect, an appropriate operation screen may be displayed on the information processing device whose usable controls of the vehicle are restricted.

A sixth aspect of the disclosure is a vehicle including: a second acquisition unit that acquires information pertaining to a switch that has been operated on a corresponding smart key; and a transmission unit that transmits the information pertaining to the switch to an information processing device in order to enable the information processing device to display an operation screen according to the information pertaining to the switch that has been acquired by the second acquisition unit.

In the sixth aspect, since the vehicle transmits to the information processing device the information pertaining to the switch that has been operated on the smart key corresponding to the vehicle, the information processing device may display an appropriate operation screen according to the corresponding vehicle.

A seventh aspect is the sixth aspect, wherein the second acquisition unit includes a second storage unit that stores, each time a switch is operated on the corresponding smart key, the information pertaining to the switch that has been operated, and the transmission unit transmits the information stored in the second storage unit to the information processing device.

According to the seventh aspect, even when plural switches have been operated after a while on the smart key, information pertaining to the plural switches that have been operated may be cumulatively stored in the second storage unit.

An eighth aspect of the disclosure is an information processing method that causes a first computer to execute a processing including: acquiring information pertaining to a switch that has been operated on a smart key corresponding to a vehicle; and performing control to display an operation screen for controlling the vehicle based on the acquired information pertaining to the switch.

According to the eighth aspect, as with the first aspect, an appropriate operation screen according to the corresponding vehicle may be displayed.

A ninth aspect of the disclosure is a non-transitory storage medium storing a program that causes a first computer to execute information processing, the information processing including: acquiring information pertaining to a switch that has been operated on a smart key corresponding to a vehicle; and performing control to display an operation screen for controlling the vehicle based on the acquired information pertaining to the switch.

According to the ninth aspect, as with the first aspect, an appropriate operation screen according to the corresponding vehicle may be displayed.

A tenth aspect of the disclosure is a transmission method that cases a second computer installed in a vehicle to execute a process including: acquiring information pertaining to a switch that has been operated on a corresponding smart key; and transmitting the information pertaining to the switch to an information processing device in order to enable the information processing device to display an operation screen according to the acquired information pertaining to the switch.

According to the tenth aspect, as with the sixth aspect, an appropriate operation screen according to the corresponding vehicle may be displayed.

An eleventh aspect of the disclosure is a non-transitory storage medium storing a program that causes a second computer installed in a vehicle to execute a transmission processing, the transmission processing including: acquiring information pertaining to a switch that has been operated on a corresponding smart key; and transmitting the information pertaining to the switch to an information processing device in order to enable the information processing device to display an operation screen according to the acquired information pertaining to the switch.

According to the eleventh aspect, as with the sixth aspect, an appropriate operation screen according to the corresponding vehicle may be displayed.

The present disclosure thus enables displaying an appropriate operation screen according to the corresponding vehicle.

DETAILED DESCRIPTION

Figure 1:
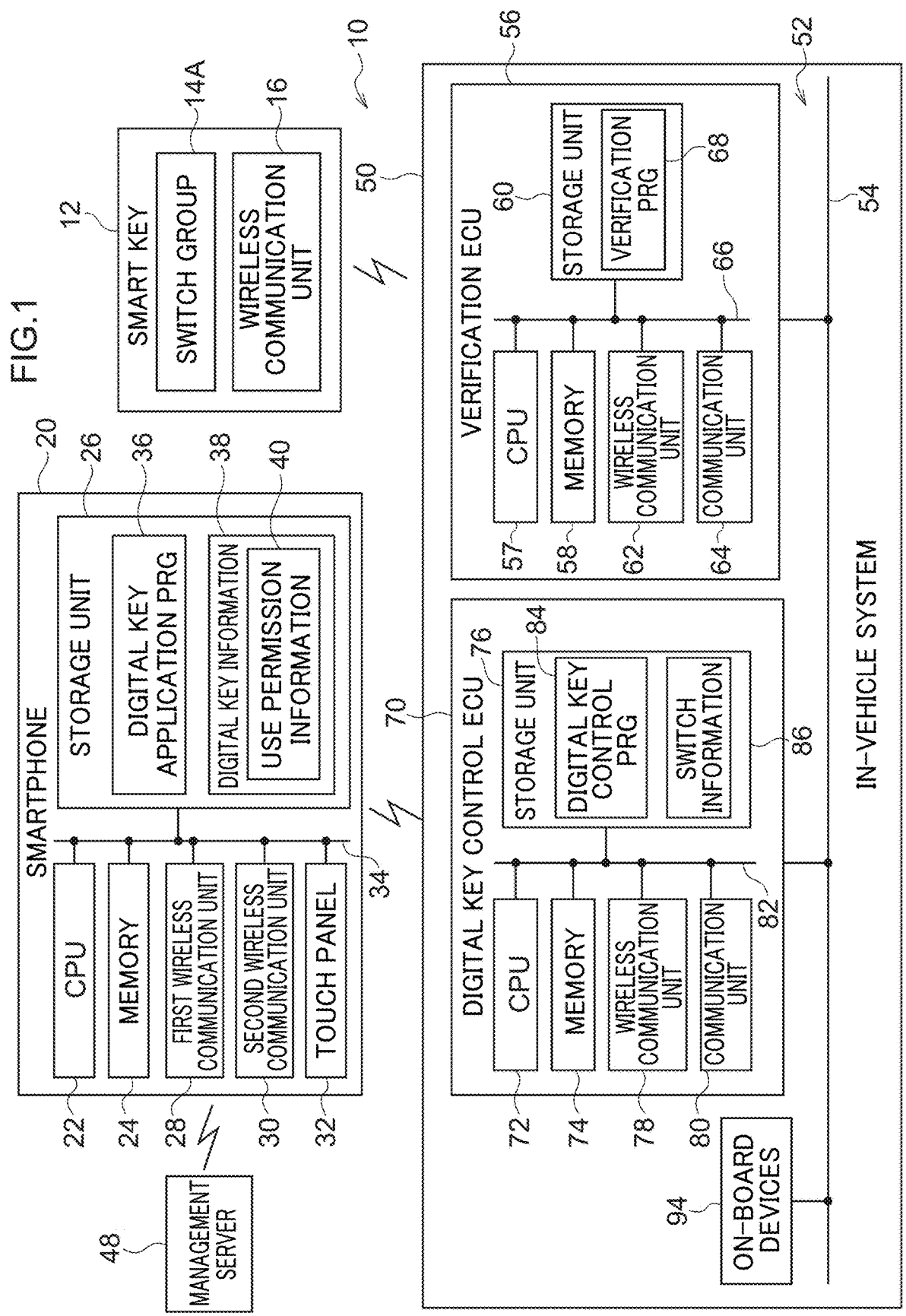
FIG. 1 is a block diagram illustrating the schematic configuration of a vehicle control system.

An example of an embodiment of the disclosure will be described in detail below with reference to the drawings. A vehicle control system 10 illustrated in FIG. 1 includes a vehicle 50 in which an in-vehicle system 52 is installed, a smart key 12 that is provided in correspondence to the vehicle 50 and is carried by the owner of the vehicle 50, and a smartphone 20 that is carried by each user who uses the vehicle 50. The smartphone 20 is an example of an information processing device and a first computer pertaining to the disclosure.

Figure 2:
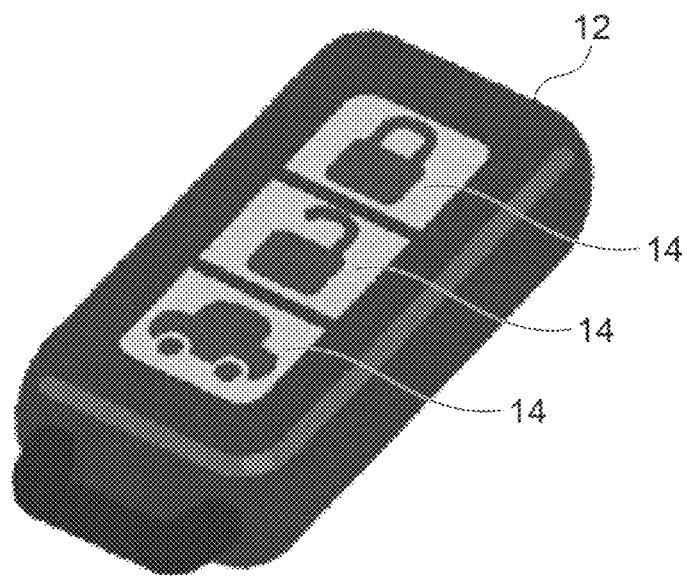
FIG. 2 is a perspective view illustrating an example of the exterior of a smart key.

As illustrated in FIG. 2, the smart key 12 is provided with plural switches 14 for performing mutually different vehicle controls. Although FIG. 2 illustrates an aspect where the smart key 12 is provided with three switches 14, the number of switches 14 provided in the smart key 12 and the vehicle controls allocated to each of the switches 14 vary by vehicle in accordance with the equipment of the vehicle, which differs depending on the model, trim level, and options package of the vehicle, for example. FIG. 1 illustrates the plural switches 14 as a switch group 14A. The smart key 12 includes the switch group 14A and a wireless communication unit 16 that transmits, in a case in which any of the switches 14 of the switch group 14A has been operated, a switch signal corresponding to the switch 14 that has been operated.

Figure 3:
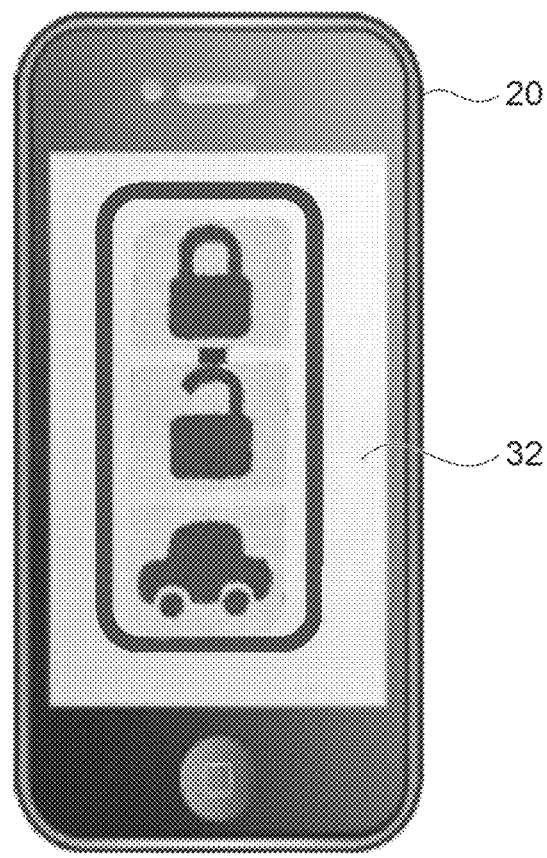
FIG. 3 is a plan view illustrating an example of the exterior of a smartphone.

The smart phone 20 includes a central processing unit (CPU) 22 and a memory 24 such as a read-only memory (ROM) and a random-access memory (RAM). The smartphone 20 also includes a nonvolatile storage unit 26 such as a hard disk drive (HDD) or a solid-state drive (SSD), a first wireless communication unit 28 that controls wireless communication with a management server 48, and a second wireless communication unit 30 that controls wireless communication (wireless communication based on, for example, the Bluetooth® Low Energy (BLE) protocol) with the vehicle 50. The smartphone 20 further includes a touch panel 32 (see also FIG. 3). The CPU 22, the memory 24, the storage unit 26, the first wireless communication unit 28, the second wireless communication unit 30, and the touch panel 32 are communicably connected to each other via an internal bus 34.

In the embodiment, when the smartphone 20 operates as a digital key, a digital key application program 36 and digital key information 38 are downloaded from the management server 48 to the smartphone 20 and stored (installed) in the storage unit 26. By using the digital key application program 36 and the digital key information 38, it becomes possible for the smartphone 20 to operate as a digital key.

Digital keys include owner's keys and shared keys. An owner's key is a digital key issued to the owner of the vehicle 50 (the user who carries the smart key 12) and may perform controls of the vehicle 50 without restrictions (perform the same controls as the smart key 12).

A shared key is a digital key issued when the owner of the vehicle 50 permits it. The owner of the vehicle 50 may put restrictions on the controls of the vehicle 50 that is possible to be executed by the shared key when the shared key is issued. For example, the owner may permit the shared key to lock and unlock the doors of the vehicle 50 but not permit the shared key to open the back door (or trunk) of the vehicle 50 or start the engine (or switch on the ignition) (or vice-versa). Furthermore, for example, the owner may also impose on the shared key a time (a length or restricted times) in which the shared key is able to be used as a digital key. Restrictions on vehicle controls that have been set on the shared key are saved as use permission information 40 in the digital key information 38. The digital key information 38 also includes key identification information that indicates whether the digital key is an owner's key or a shared key.

In this way, in this embodiment, by storing electronic information (the digital key application program 36 and the digital key information 38) in the storage unit 26 of the smartphone 20, it becomes possible for the smartphone 20 to operate as a digital key (an owner's key or a shared key). Because of this, when a user borrows the vehicle 50 from the owner of the vehicle 50, it becomes unnecessary for the owner of the vehicle 50 and the user to physically hand over the smart key 12 between them, and even when the user is in a remote location, the key for the vehicle 50 is able to be shared just by transmitting and receiving the electronic information. Furthermore, because it becomes possible for the smartphone 20 to operate as a digital key, there is also the advantage that when going out the owner of the vehicle 50, too, no longer needs to have the smart key 12 on hand so long as the owner is carrying the smartphone 20.

Figure 4:
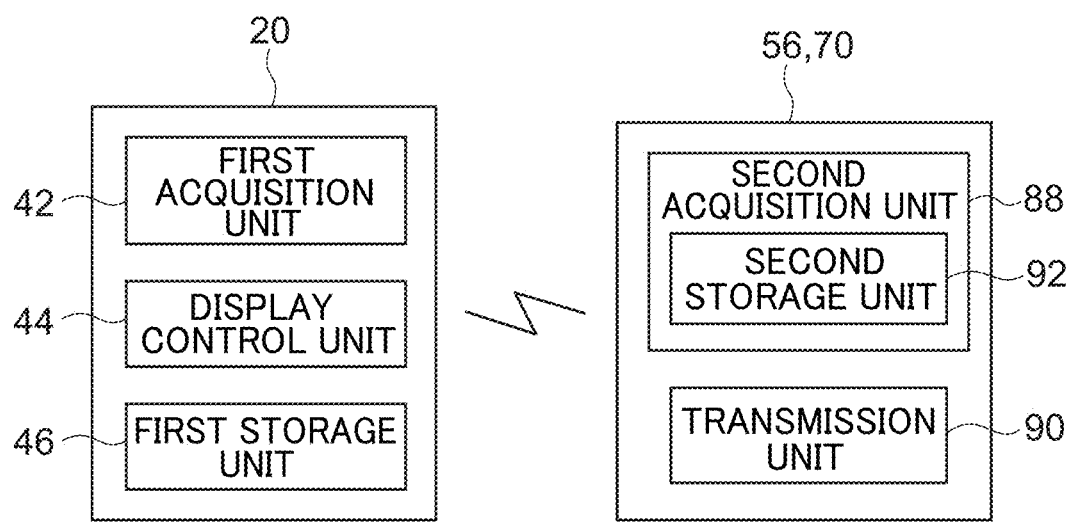
FIG. 4 is a functional block diagram of the smartphone, a verification ECU, and a digital key control ECU.

The smartphone 20 functions as a first acquisition unit 42 and a display control unit 44 illustrated in FIG. 4 as a result of the digital key application program 36 being read from the storage unit 26 and loaded to the memory 24, and the digital key application program 36 that has been loaded to the memory 24 being executed by the CPU 22. The first acquisition unit 42 acquires information pertaining to a switch 14 that has been operated on the smart key 12 corresponding to the vehicle 50. The display control unit 44 performs control to display an operation screen for controlling the vehicle 50 based on the information pertaining to the switch 14 that has been acquired by the first acquisition unit 42. Furthermore, the storage unit 26 that saves the digital key information 38 including the use permission information 40 functions as a first storage unit 46 illustrated in FIG. 4. The digital key application program 36 is an example of an information processing program pertaining to the disclosure.

The in-vehicle system 52 includes a system bus 54, and a verification electronic control unit (ECU) 56, a digital key control ECU 70, and on-board devices 94 are connected to the system bus 54 so as to be communicable with each other.

The verification ECU 56 includes a CPU 57, a memory 58 such as a ROM and a RAM, a nonvolatile storage unit 60 such as an HDD or an SSD, a wireless communication unit 62 that controls wireless communication with the smart key 12, and a communication unit 64 that controls communication via the system bus 54. The CPU 57, the memory 58, the storage unit 60, the wireless communication unit 62, and the communication unit 64 are communicably connected to each other via an internal bus 66.

A verification program 68 is stored beforehand in the storage unit 60. The verification ECU 56 functions as part of a second acquisition unit 88 illustrated in FIG. 4 as a result of the verification program 68 being read from the storage unit 60 and loaded to the memory 58, and the verification program 68 that has been loaded to the memory 58 being executed by the CPU 57.

The digital key control ECU 70 includes a CPU 72, a memory 74 such as a ROM and a RAM, a nonvolatile storage unit 76 such as an HDD or an SSD, a wireless communication unit 78 that controls wireless communication with the smartphone 20, and a communication unit 80 that controls communication via the system bus 54. The CPU 72, the memory 74, the storage unit 76, the wireless communication unit 78, and the communication unit 80 are communicably connected to each other via an internal bus 82.

A digital key control program 84 and switch information 86 are stored beforehand in the storage unit 76. In the embodiment, in an initial state of the switch information 86 when the vehicle 50 is shipped (i.e., a stage when none of the switches 14 provided in the smart key 12 have been operated even once on the smart key 12), the contents of the switch information 86 are empty. Then, after any of the switches 14 on the smart key 12 is operated, the verification ECU 56 performs a later-described switch signal reception process and the digital key control ECU 70 performs a later-described switch information storage process, whereby information pertaining to the switch 14 that has been operated is additively stored in the switch information 86.

The digital key control ECU 70 functions as part of the second acquisition unit 88 illustrated in FIG. 4 and also functions as a transmission unit 90 as a result of the digital key control program 84 being read from the storage unit 76 and loaded onto the memory 74, and the digital key control program 84 that has been loaded onto the memory 74 being executed by the CPU 72.

The second acquisition unit 88 acquires information pertaining to a switch 14 that has been operated on the corresponding smart key 12. The second acquisition unit 88 includes a second storage unit 92 that stores, each time a switch 14 is operated on the corresponding smart key 12, information pertaining to the switch 14 that has been operated (the switch information 86). Furthermore, the transmission unit 90 transmits the information pertaining to the switch 14 to the smartphone 20 in order to enable the smartphone 20 to display an operation screen according to the information pertaining to the switch 14 that has been acquired by the second information unit 88. The verification program 68 stored in the storage unit 60 of the verification ECU 56 and the digital key control program 84 stored in the storage unit 76 of the digital key control ECU 76 are an example of a transmission program pertaining to the disclosure. Furthermore, the verification ECU 56 and the digital key control ECU 70 are an example of a second computer in the disclosure.

The on-board devices 94 include, as devices that are installed in the vehicle 50 and are able to be controlled by the smart key 12 or the smartphone 20, a door lock device, a device for opening and closing the back door (or trunk), and a device for opening and closing the right and left doors of the vehicle 50.

Next, operations of the embodiment will be described with reference to FIG. 5, firstly for a case in which the smart key 12 has been operated. A case will be considered in which a user holding the smart key 12 (i.e., the owner of the vehicle 50) approaches the vehicle 50 (see also step 150 in FIG. 5) and operates any of the switches 14 among the switch group 14A provided in the smart key 12 (see also step 152 of FIG. 5). In this case, in step 154, the wireless communication unit 16 of the smart key 12 transmits a switch signal corresponding to the switch 14 that has been operated.

The switch signal that has been transmitted from the smart key 12 is received by the wireless communication unit 62 of the verification ECU 56, and upon receiving the switch signal the verification ECU 56 performs the switch signal reception process. In step 156 of the switch signal reception process, the verification ECU 56 (the second acquisition unit 88) transfers (or gateways) the received switch signal via the system bus 54 to the digital key control ECU 70 and ends the switch signal reception process.

The switch signal that has been transferred from the verification ECU 56 is received by the communication unit 80 of the digital key control ECU 70, and upon receiving the switch signal the digital key control ECU 70 performs the switch information storage process.

In step 158 of the switch information storage process, the digital key control ECU 70 (the second acquisition unit 88) additionally stores information pertaining to the switch corresponding to the received switch signal in the switch information 86 stored in the storage unit 76 (the second storage unit 92). The information pertaining to the switch that has been additionally stored in the switch information 86 includes information indicating the kind of the switch 14 that was operated on the smart key 12.

In the next step 160, the digital key control ECU 70 causes the device among the on-board devices 94 that corresponds to the switch signal received from the verification ECU 56 to execute a process according to the received switch signal. For example, in a case in which the switch 14 for instructing that the doors of the vehicle 50 be unlocked has been operated on the smart key 12, the digital key control ECU 70 causes the door lock device of the vehicle 50 to execute a process to unlock the doors of the vehicle 50. After the digital key control ECU 70 performs the process of step 160, it ends the switch information storage process. The process of step 160 may also be executed by the verification ECU 56.

Figure 5:
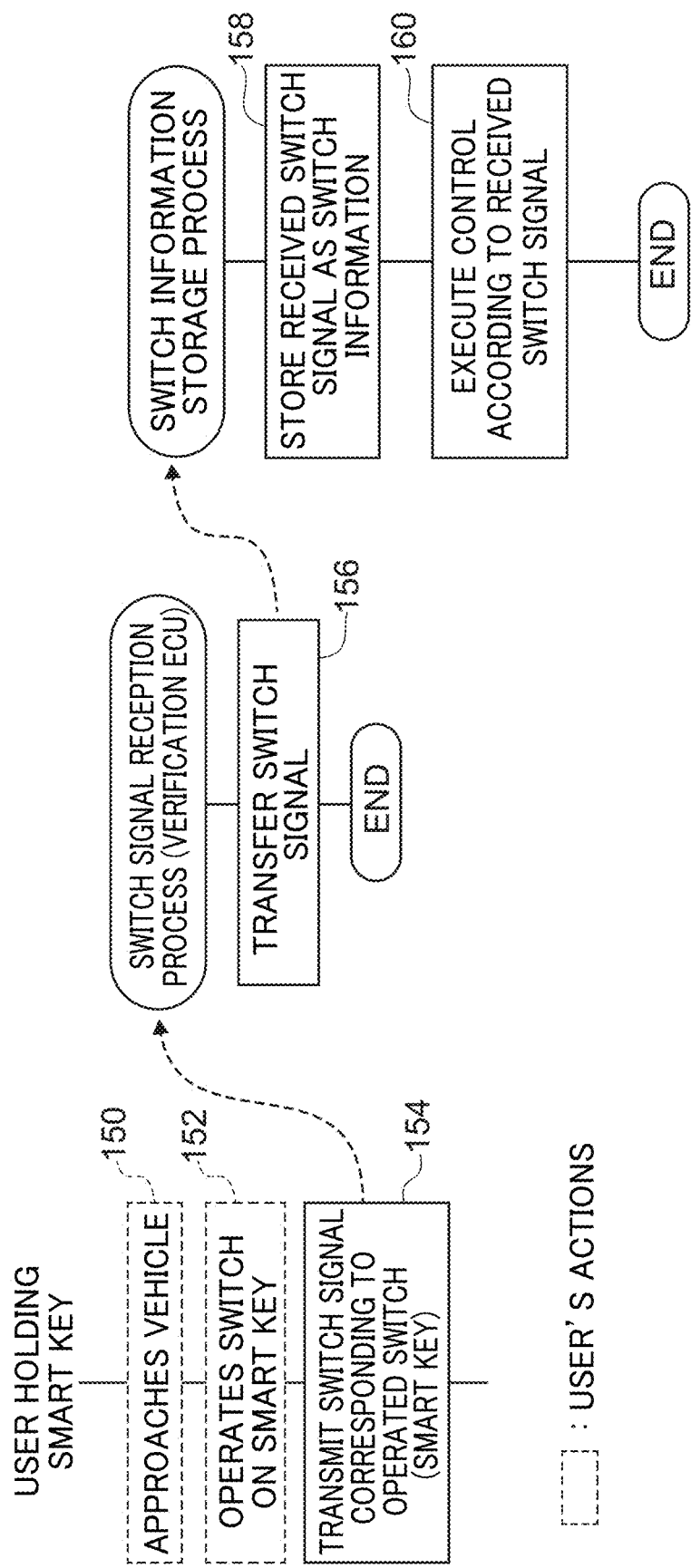
FIG. 5 is a flowchart illustrating processes executed by the verification ECU and the digital key control ECU when a user operates a switch on the smart key.

In this way, in the embodiment, each time any of the switches 14 is operated on the smart key 12, the series of sequences illustrated in FIG. 5 is executed. Additionally, information including information indicating the kinds of all the switches 14 that have been operated one time or more on the smart key 12 is cumulatively stored as the switch information 86 in the storage unit 76 (the second storage unit 92).

Figure 6:
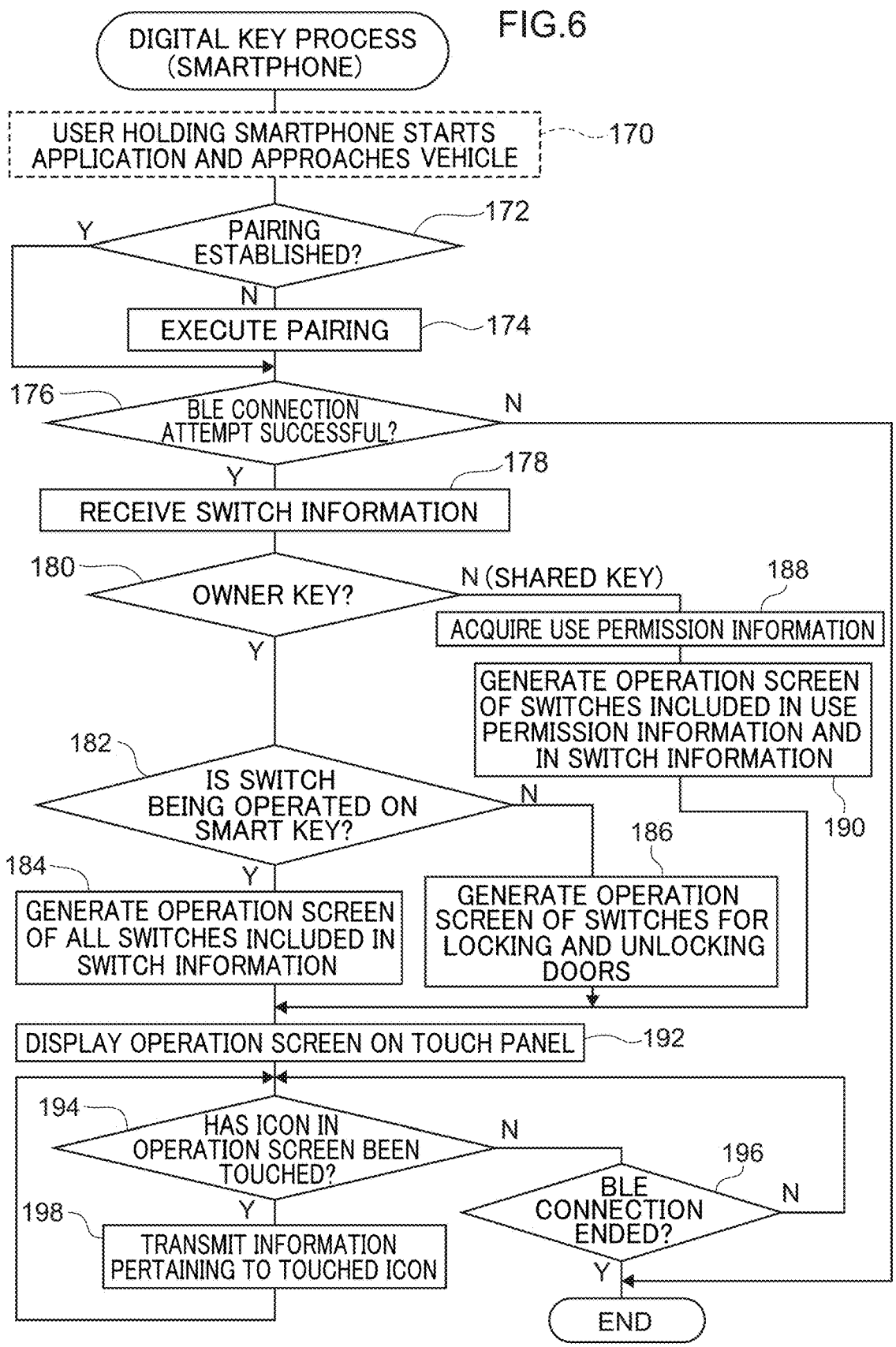
FIG. 6 is a flowchart illustrating a digital key process executed by the smartphone.

Next, a digital key process executed by the smartphone 20 will be described with reference to FIG. 6. The digital key process is started when, as illustrated in FIG. 6 as step 170, the user carrying the smartphone 20 starts the digital key application program 36 on the smartphone 20 and approaches the vehicle 50 to within a distance at which communication using BLE is possible.

In step 172 of the digital key process, the first acquisition unit 42 determines whether or not pairing between the smartphone 20 and the vehicle 50 (the digital key control ECU 70) has been established. The digital key process moves to step 176 in a case in which the determination in step 172 is YES and moves to step 174 in a case in which the determination in step 172 is NO. In step 174, the first acquisition unit 42 executes pairing between the smartphone 20 and the vehicle 50.

In the next step 176 the first acquisition unit 42 determines whether or not the attempt to connect to the vehicle 50 using BLE has been successful. Examples of cases in which the attempt to connect to the vehicle 50 using BLE fails include a case in which the connection attempt is affected by noise. In a case in which the determination in step 176 is NO, the first acquisition unit 42 ends the digital key process. In this case, a later-described operation screen is not displayed on the touch panel 32 of the smartphone 20.

Figure 8:
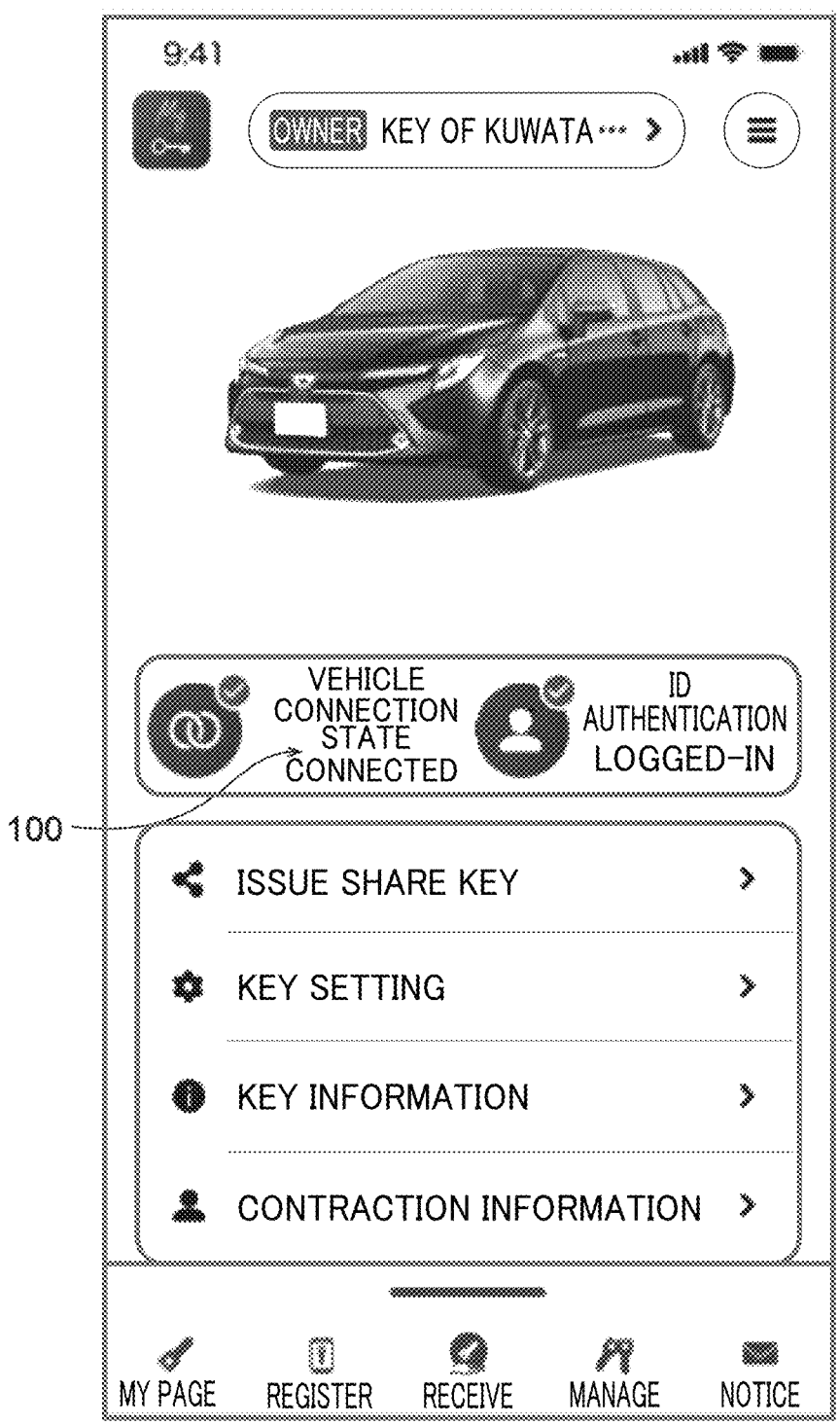
FIG. 8 is an illustration illustrating a screen displayed on a touch panel of the smartphone when a BLE connection between the smartphone and a vehicle has been successfully established.

Furthermore, in a case in which the attempt to connect to the vehicle 50 using BLE has been successful, the determination in step 176 becomes YES, the first acquisition unit 42 displays on the touch panel 32 a screen including a message 100 indicating that a connection has been successfully established as illustrated in FIG. 8 as an example, and thereafter the digital key process moves to step 178. In step 178 the first acquisition unit 42 receives the switch information 86 from the digital key control ECU 70. The transmission of the switch information 86 from the digital key control ECU 70 will be described later.

In the next step 180 the display control unit 44 references the key identification information included in the digital key information 38 stored in the storage unit 26 and determines whether the host device (i.e., the smartphone 20) is an owner's key. In a case in which the determination in step 180 is YES, the digital key process moves to step 182. In step 182 the display control unit 44 determines whether or not one or more of the switches 14 provided in the smart key 12 have been operated in the past on the smart key 12 based on the switch information 86 received from the digital key control ECU 70.

As mentioned above, in the initial state of the switch information 86 the contents of the switch information 86 are empty, and each time a switch 14 is operated on the smart key 12, information pertaining to the switch 14 that has been operated is additionally stored. For this reason, in a case in which the contents of the switch information 86 received from the digital key control ECU 70 are not empty, the determination in step 182 becomes YES and the digital key process moves to step 184.

Figure 9:
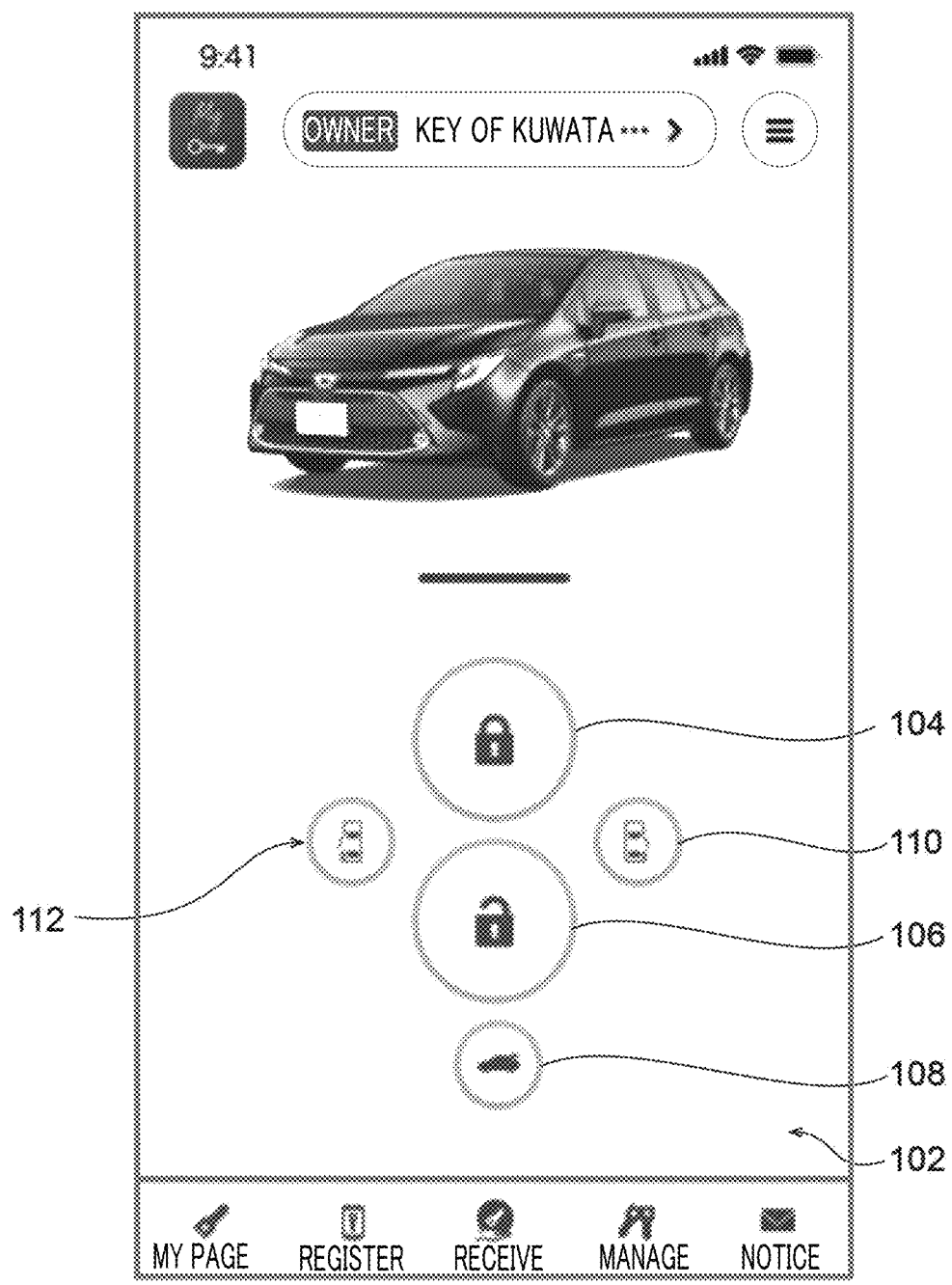
FIG. 9 is an illustration illustrating an example of an operation screen displayed on the touch panel of the smartphone.

In step 184 the display control unit 44 generates an operation screen in which are displayed, as icons for controlling the vehicle 50, icons corresponding to all the switches 14 included in the received switch information 86. FIG. 9 illustrates an example of the operation screen that is generated in step 184.

An operation screen 102 illustrated in FIG. 9 includes, as icons for controlling the vehicle 50, an icon 104 for locking the doors of the vehicle 50, an icon 106 for unlocking the doors of the vehicle 50, and an icon 108 for opening the back door of the vehicle 50. The operation screen 102 also includes, as icons for controlling the vehicle 50, an icon 110 for opening the doors on the right side of the vehicle 50 and an icon 112 for opening the doors on the left side of the vehicle 50.

After the display control unit 44 performs the process of step 184, the digital key process moves to step 192. In step 192 the display control unit 44 displays the operation screen 102 it has generated on the touch panel 32. This makes it possible for the user holding the smartphone 20 operating as an owner's key (i.e., the owner of the vehicle 50) to perform, via the operation screen 102, controls of the vehicle 50 corresponding to the switches 14 that have been operated in the past on the smart key 12.

Figure 10:
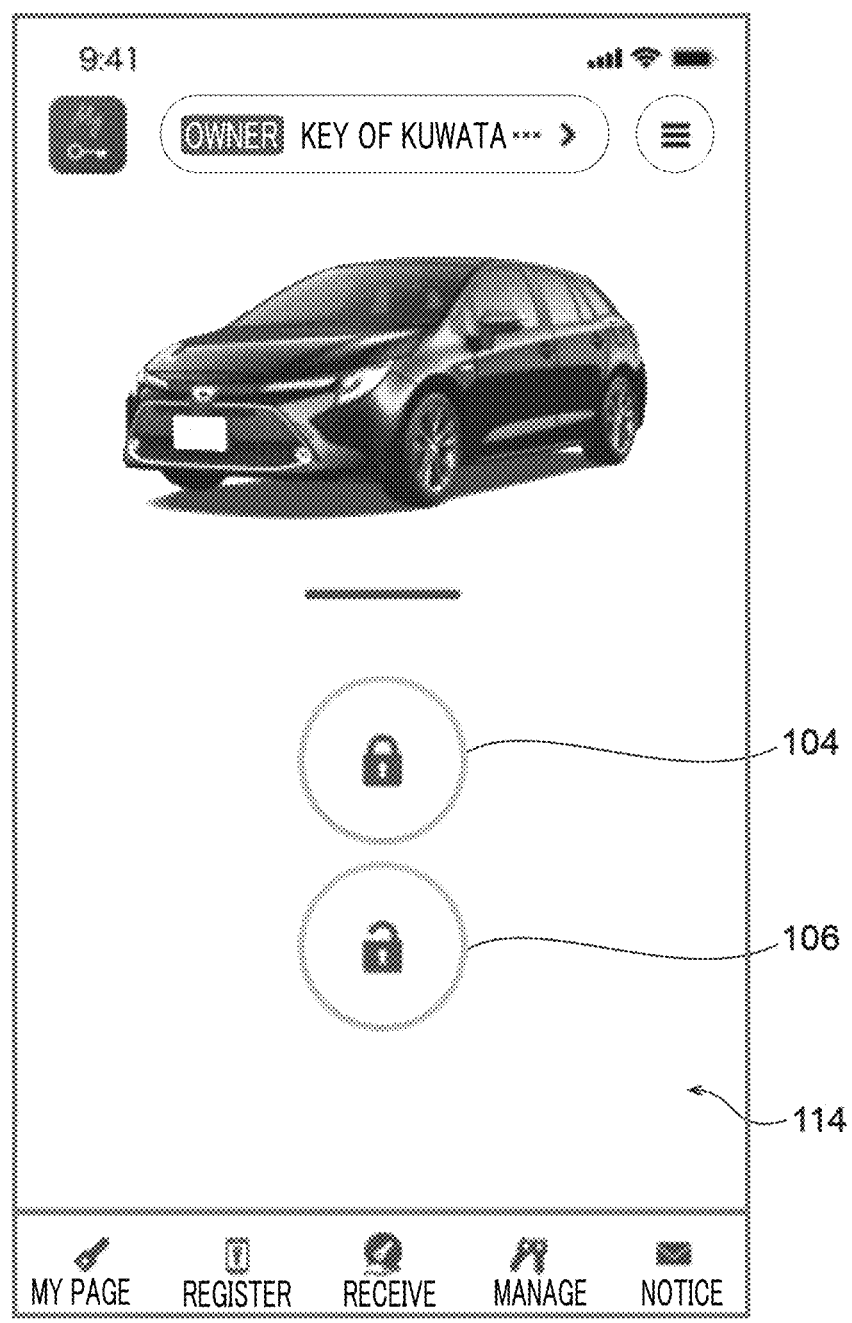
FIG. 10 is an illustration illustrating an example of an operation screen displayed on the touch panel of the smartphone.

In a case in which the contents of the switch information 86 received from the digital key control ECU 70 are empty, the determination in step 182 becomes NO and the digital key process moves to step 186. In step 186 the display control unit 44 generates an operation screen 114 (see FIG. 10) that includes, as icons for controlling the vehicle 50, only the icon 104 for locking the doors of the vehicle 50 and the icon 106 for unlocking the doors of the vehicle 50. In the operation screen 114 the icon 104 is an example of a first icon in the disclosure and the icon 106 is an example of a second icon in the disclosure. After the display control unit 44 performs the process of step 186, the digital key process moves to step 192. In step 192 the display control unit 44 displays the operation screen 114 it has generated on the touch panel 32.

Locking and unlocking the doors of the vehicle 50 are controls common to the vehicle 50 regardless of the model, trim level, and options package of the vehicle 50. For this reason, by displaying the operation screen 114 including the icon 104 and the icon 106, it becomes possible for the user (i.e., the owner of the vehicle 50) to perform minimum controls common to the vehicle 50 even at the stage in which the switches 14 have not been operated on the smart key 12.

In a case in which the host device (i.e., the smartphone 20) is a shared key, the determination in step 180 becomes NO and the display key process moves to step 188. In step 188 the display control unit 44 acquires from the storage unit 26 the use permission information 40 included in the digital key information 38. In step 190 the display control unit 44 generates an operation screen on which are displayed, as icons for controlling the vehicle 50, icons corresponding to the switches 14 that are included in the received switch information 86 and in the use permission information 40 (the switches 14 corresponding to the controls of the vehicle that the shared key is permitted to use by the owner of the vehicle 50).

After the display control unit 44 performs the process of step 190, the digital key process moves to step 192. In step 192 the display control unit 44 displays the operation screen 114 it has generated on the touch panel 32. Because of this, an appropriate operation screen may be displayed on the touch panel 32 of the smartphone 20 whose usable controls of the vehicle are restricted (the smartphone 20 operating as a shared key).

In step 194 the smartphone 20 determines whether or not an icon in the operation screen displayed on the touch panel 32 has been touched. In a case in which the determination in step 194 is NO, the digital key process moves to step 196. In step 196, the smartphone 20 determines whether or not the connection to the vehicle 50 using BLE has ended. In a case in which the determination in step 196 is also NO, the digital key process returns to step 194 and repeats steps 194 and 196 until any determination becomes YES.

After an icon in the operation screen being displayed on the touch panel 32 is touched, the determination in step 194 becomes YES and the digital key process moves to step 198. In step 198 the smartphone 20 transmits to the vehicle 50 (the digital key control ECU 70) information pertaining to the icon that was touched in the operation screen. After the connection to the vehicle 50 using BLE ends, the determination in step 196 becomes YES and the digital key process ends.

Figure 7:
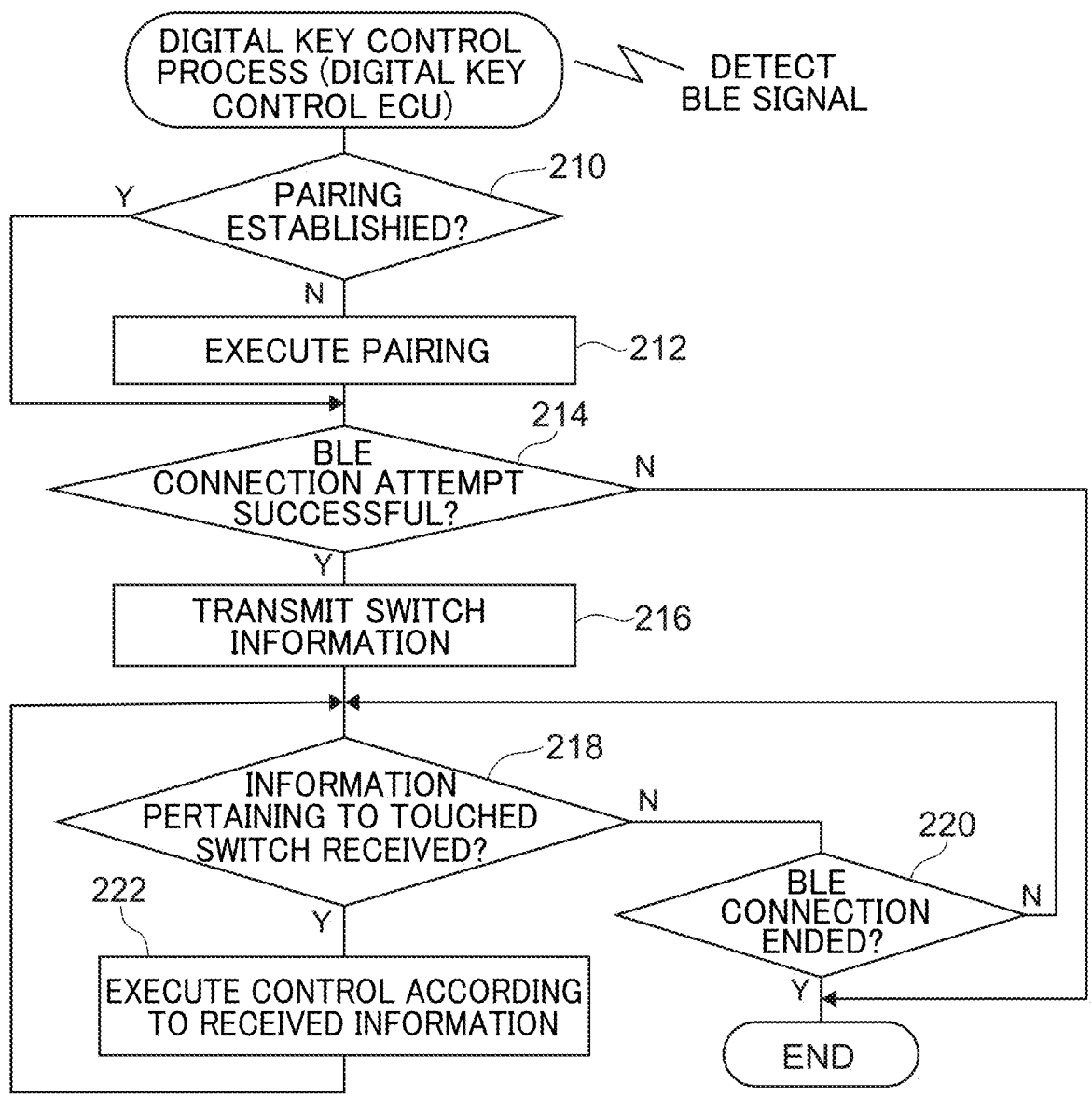
FIG. 7 is a flowchart illustrating a digital key control process executed by the digital key control ECU.

Next, a digital key control process performed by the digital key control ECU 70 when it receives the BLE signal from the smartphone 20 will be described with reference to FIG. 7.

In step 210 of the digital key control process, the digital key control ECU 70 determines whether or not pairing with the smartphone 20 has been established. In a case in which the determination in step 210 is YES, the digital key control process moves to step 214, but in a case in which the determination in step 210 is NO, the digital key control process moves to step 212. In step 212 the digital key control ECU 70 executes pairing with the smartphone 20.

In the next step 214 the digital key control ECU 70 determines whether or not the attempt to connect to the smartphone 20 using BLE was successful. Examples of cases in which the attempt to connect to the smartphone 20 using BLE fails include a case in which the connection attempt is affected by noise. In a case in which the determination of step 214 is NO, the digital key control process ends. In a case in which the determination in step 214 is YES, the digital key control process moves to step 216.

In step 216 the second acquisition unit 88 reads the switch information 86 from the storage unit 76, and the transmission unit 90 transmits the switch information 86 that has been acquired by the second acquisition unit 88 to the smartphone 20. The switch information 86 transmitted here is received by the smartphone 20 in step 178 of FIG. 6.

In step 218 the digital key control ECU 70 determines whether or not it has received from the smartphone 20 information pertaining to an icon that has been touched in the operation screen displayed on the touch panel 32. In a case in which the determination in step 218 is NO, the digital key control process moves to step 220. In step 220 the digital key control ECU 70 determines whether or not the connection to the smartphone 20 using BLE has ended. In a case in which the determination in step 220 is also NO, the digital key control process returns to step 218 and repeats steps 218 and 220 until any determination becomes YES.

After the digital key control ECU 70 receives from the smartphone 20 information pertaining to an icon that has been touched, the determination in step 218 becomes YES and the digital key control process moves to step 222. In step 222 the digital key control ECU 70 causes the device among the on-board devices 94 that corresponds to the information pertaining to the icon received from the smartphone 20 to execute a process corresponding to the information pertaining to the icon it received. After the connection to the smartphone 20 using BLE ends, the determination in step 220 becomes YES and the digital key control process ends.

As described above, the smartphone 20 pertaining to this embodiment may be used to control the vehicle 50, and the first acquisition unit 42 acquires information pertaining to a switch 14 that has been operated on the smart key 12 corresponding to the vehicle 50. The display control unit 44 performs control to display an operation screen for controlling the vehicle 50 based on the information pertaining to the switch 14 that has been acquired by the first acquisition unit 42. Because of this, an appropriate operation screen according to the corresponding vehicle 50 may be displayed.

Furthermore, in this embodiment, the first acquisition unit 42 acquires the information pertaining to the switch 14 by receiving it from the vehicle 50. Because of this, even if the smartphone 20 was not operating when the switch 14 was operated on the smart key 12, the first acquisition unit 42 may acquire the information pertaining to the switch 14 from the vehicle 50.

Furthermore, in this embodiment, in a case in which the switch 14 has not been operated on the smart key 12, the display control unit 44 performs control to display, as the operation screen, an operation screen including a first icon for locking the doors of the vehicle 50 and a second icon for unlocking the doors of the vehicle 50. Because of this, even at the stage in which the switch 14 has not been operated on the smart key 12, it becomes possible to perform minimum controls common to the vehicle 50.

Furthermore, in the embodiment, the use permission information 40 that defines controls of the vehicle 50 whose use by the smartphone 20 (shared key) is permitted is stored in the first storage unit 46. The display control unit 44 performs control to display an operation screen including icons corresponding to the controls of the vehicle 50 whose use is permitted by the use permission information stored in the first storage unit 46 among controls of the vehicle corresponding to switches whose information has been acquired by the first acquisition unit 42. Because of this, an appropriate operation screen may be displayed on the smartphone 20 (shared key) whose usable controls of the vehicle 50 are restricted.

Furthermore, in the vehicle 50 pertaining to the embodiment, the second acquisition unit 88 acquires information pertaining to a switch 14 that has been operated on the corresponding smart key 12. The transmission unit 90 transmits the information pertaining to the switch 14 to the smartphone 20 in order to enable the smartphone 20 to display an operation screen according to the information pertaining to the switch 14 that has been acquired by the second acquisition unit 88. Because of this, the smartphone 20 may display an appropriate operation screen according to the corresponding vehicle 50. Furthermore, the configuration of the vehicle 50 or the server may be simplified compared to a case in which all controls realizable by the smart key 12, which differ by vehicle 50, are registered beforehand in the vehicle 50 or the server.

Furthermore, in the embodiment, the second acquisition unit 88 includes the second storage unit 92 that stores, each time a switch 14 is operated on the corresponding smart key 12, information pertaining to the switch 14 that has been operated. The transmission unit 90 transmits the information stored in the second storage unit 92 to the smartphone 20. Because of this, even in a case in which plural switches 14 have been operated after a while on the smart key 12, information pertaining to the plural switches 14 that have been operated may be cumulatively stored in the second storage unit 92.

Although in the above embodiment an aspect has been described in which the first acquisition unit 42 acquires the switch information 86 by receiving it from the vehicle 50, the disclosure is not limited to this. For example, when a switch 14 is operated on the smart key 12, a switch signal is transmitted from the smart key 12 to the vehicle 50 (the verification ECU 56). The first acquisition unit 42 may be configured to acquire the switch information 86 by intercepting the switch signal that is transmitted from the smart key 12 to the vehicle 50 (the verification ECU 56). According to this aspect, the switch information 86 may be acquired without altering the configuration of the vehicle 50.

Furthermore, in the above embodiment, the smartphone 20 has been described as an example of the information processing device pertaining to the disclosure. However, the information processing device pertaining to the disclosure is not limited to a configuration in which, as in the smartphone 20, the touch panel 32 (display unit) on which the operation screen is displayed is housed in the same casing as the CPU 22, the memory 24, and the nonvolatile storage unit 26. For example, in the information processing device pertaining to the disclosure, the display unit on which the operation screen is displayed may also be provided separately from the casing that houses the CPU 22, the memory 24, and the nonvolatile storage unit 26, and in this case the display unit may also be a smart glass.

Furthermore, in the above embodiment, a case has been described where the communication between the smartphone 20 and the vehicle 50 (i.e., the digital key control ECU 70) is wireless communication based on BLE. However, the wireless communication protocol is not limited to BLE, and the smartphone 20 and the vehicle 50 may also be configured to perform wireless communication based on another protocol such as Wi-Fi (registered trademark).

Furthermore, in the above embodiment, an example has been described where the contents of the switch information 86 are empty in the initial state, but the disclosure is not limited to this. For example, in the initial state of the switch information 86, information pertaining to the switch 14 for locking the doors of the vehicle 50 and the switch 14 for unlocking the doors of the vehicle 50 may also be stored beforehand in the switch information 86.

Furthermore, in the above description, an example has been described where the digital key application program 36 that is an example of the information processing program pertaining to the disclosure is stored (installed) in the storage unit 26 and where the verification program 68 and the digital key control program 84 that are an example of the transmission program pertaining to the disclosure are stored beforehand in the storage units 60 and 76. However, it is also possible for at least one of the information processing program and the transmission program pertaining to the disclosure to be provided in a form in which it is recorded in a non-transitory recording medium such as an HDD, an SSD, and a DVD.

What is claimed is:

1. An information processing device that is used to control a vehicle, the information processing device comprising:
   a memory; and
   a processor that is coupled to the memory and is configured to:
   acquire information pertaining to a switch that has been operated on a smart key corresponding to the vehicle; and
   perform control to display an operation screen for controlling the vehicle based on the acquired information pertaining to the switch.

2. The information processing device of claim 1, wherein the processor is further configured to acquire the information pertaining to the switch by receiving the information from the vehicle.

3. The information processing device of claim 1, wherein the processor is further configured to acquire the information pertaining to the switch by intercepting communication from the smart key to the vehicle, which accompanies the switch being operated on the smart key.

4. The information processing device of claim 1, wherein processor is further configured to, in a case in which the switch has not been operated on the smart key, performs control to display, as the operation screen, an operation screen including a first icon for locking doors of the vehicle and a second icon for unlocking the doors of the vehicle.

5. The information processing device of claim 1, further comprising a first storage unit that stores use permission information that defines one or more controls of the vehicle that are permitted for the information processing device,
   wherein the processor is further configured to perform control to display an operation screen including icons corresponding to the controls of the vehicle that is permitted by the use permission information among controls of the vehicle corresponding to switches whose information has been acquired.

6. A vehicle comprising:
   a memory; and
   a processor that is coupled to the memory and is configured to:
   acquire information pertaining to a switch that has been operated on a corresponding smart key; and
   transmits the information pertaining to the switch to an information processing device in order to enable the information processing device to display an operation screen according to the acquired information pertaining to the switch.

7. The vehicle of claim 6, further comprising a second storage unit that stores, each time a switch is operated on the corresponding smart key, information pertaining to the switch that has been operated, and
the processor is further configured to transmit the information stored in the second storage unit to the information processing device.

8. An information processing method comprising:
acquiring information pertaining to a switch that has been operated on a smart key corresponding to a vehicle; and
performing control to display an operation screen for controlling the vehicle based on the acquired information pertaining to the switch.

9. A non-transitory storage medium storing a program that causes a computer to execute information processing, the information processing comprising:
acquiring information pertaining to a switch that has been operated on a smart key corresponding to a vehicle; and
performing control to display an operation screen for controlling the vehicle based on the acquired information pertaining to the switch.

10. A transmission method comprising:
acquiring, at a vehicle, information pertaining to a switch that has been operated on a corresponding smart key; and
transmitting the information pertaining to the switch from the vehicle to an information processing device in order to enable the information processing device to display an operation screen according to the acquired information pertaining to the switch.

11. A non-transitory storage medium storing a program that causes a computer installed in a vehicle to execute a transmission processing, the transmission processing comprising:
acquiring information pertaining to a switch that has been operated on a corresponding smart key; and
transmitting the information pertaining to the switch to an information processing device in order to enable the information processing device to display an operation screen according to the acquired information pertaining to the switch.

* * * * *